United States Patent
Shibata et al.

(10) Patent No.: US 11,283,340 B2
(45) Date of Patent: Mar. 22, 2022

(54) COIL ASSEMBLY AND STEPPING MOTOR USING SAME

(71) Applicant: MINEBEA MITSUMI Inc., Nagano (JP)

(72) Inventors: Hiroichi Shibata, Fukuroi (JP); Taketoshi Ohyashiki, Shizuoka (JP); Hiroshi Sano, Fukuroi (JP); Makoto Kinoshita, Kakegawa (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/987,505

(22) Filed: Aug. 7, 2020

(65) Prior Publication Data
US 2021/0044195 A1     Feb. 11, 2021

(30) Foreign Application Priority Data

Aug. 9, 2019 (JP) .............................. JP2019-147662

(51) Int. Cl.
*H02K 3/52*       (2006.01)
*H02K 37/14*      (2006.01)

(52) U.S. Cl.
CPC ............. *H02K 37/14* (2013.01); *H02K 3/525* (2013.01)

(58) Field of Classification Search
CPC ...... H01F 5/04; H01F 2005/043; H01F 27/29; H02K 3/525
See application file for complete search history.

(56) References Cited

FOREIGN PATENT DOCUMENTS

| JP | 2011-078152 A | 4/2011 |
|---|---|---|
| JP | 2019-080452 A | 5/2019 |

*Primary Examiner* — Ramon M Barrera
(74) *Attorney, Agent, or Firm* — Pearne & Gordon LLP

(57) ABSTRACT

A coil assembly in which a slack can be formed in a coil wire without increasing assembly cost, and a stepping motor using the same, are provided; the coil assembly includes a bobbin 232 having flange portions 233 and 234 at both ends thereof, multiple terminal pin embedding portions 235a arranged at one flange portion 234, a terminal pin 236 embedded in the terminal pin embedding portion 235a, and a coil 231 of which an end portion of coil wire 237 is entwined around the terminal pin 236, the coil wire 237 wound around the bobbin 232, in which a concave portion 238 which concaves to a radial direction of the bobbin 232 and penetrates to an axial direction of the bobbin 232 is formed between the terminal pin embedding portions 235a, the coil wire 237 exists from a base portion of the terminal pin 236, passes through the concave portion 238, started to be wound around the bobbin 232, and has a slack portion 237a which exists in the concave portion 238.

10 Claims, 4 Drawing Sheets

COIL ASSEMBLY AND STEPPING MOTOR USING SAME

TECHNICAL FIELD

The present invention relates to a coil assembly in which a slack is formed at an end of a coil, and relates to a stepping motor using the coil assembly.

BACKGROUND ART

Conventionally, as a stepping motor, a PM-type (Permanent Magnet-type) stepping motor is known which includes a rotor made of a permanent magnet and a stator having multiple pole teeth arranged around the rotor along a circumferential direction thereof and protruding to an axial direction thereof. In this PM-type stepping motor, an outer yoke having multiple pole teeth arranged circumferentially, and an inner yoke having multiple pole teeth arranged circumferentially, are combined, and a coil is housed inside the outer yoke and the inner yoke, thereby forming the stator. Then, the rotor made of a permanent magnet is arranged therein so as to be rotatable relative to the stator.

Here, a coil wire is wound around a bobbin by an automatic winding apparatus. The coil wire, which is entwined around and connected to a terminal pin arranged at a terminal block of the bobbin, is in a condition being imparted with tensile force. In particular, since the coil wire which is entwined around and connected to the terminal pin is pressed and is newly wound from above thereof at a side of a start of a winding, a short portion of the coil wire is in a condition of having a tensile force. In a case in which assembly is continued while this tensile force remains, there is a risk of the coil wire breaking. Therefore, it is necessary to provide a slack in a coil wire near a terminal pin. As a method of forming a slack in a coil wire, the method disclosed in Patent Document 1 is known.

In Patent Document 1, a method for production of a motor is disclosed in which, during assembly of a bobbin in a stator part, a terminal block which is unitary with the bobbin is pushed by the stator part from the inside and is moved outwardly in a radial direction, thereby forming a slack in a drawing part of the coil near the terminal pin.

Patent Document 1 is Japanese Unexamined Patent Application Publication No. 2011-78152.

SUMMARY OF THE INVENTION

In the method disclosed in Patent Document 1, it is necessary that the terminal block be pushed in an outwardly radial direction by the stator part. Therefore, it is necessary to employ a method in which the terminal block of the bobbin is preliminarily deformed in an outwardly radial direction, and then, while maintaining the condition, the bobbin and the stator part are joined, or to employ a method in which the stator part is contacted inside the terminal block of the bobbin from an oblique direction, thereby pressing the terminal block outwardly in a radial direction, and while maintaining this condition, the stator part is engaged inside of the bobbin.

However, operation is complicated in the former method, and there is a risk of breaking the terminal block due to excessive deformation of the terminal block. Furthermore, in the latter method, due to variation of sizes of parts, inclination of the terminal block varies, thereby varying pitch between terminal pins, and it may be difficult to insert the terminal pin into a hole of a circuit board, and workability is deteriorated.

The present invention was completed in view of the above circumstances, and an object of the present invention is to provide a coil assembly in which a slack can be provided in a coil wire without increasing assembly cost by facilitating operation, and to provide a stepping motor using the same.

The present invention is a coil assembly including: a bobbin having flange portions at both end portions, multiple terminal pin embedding portions arranged at one of the flange portions, a terminal pin embedded in the terminal pin embedding portion, and a coil of which an end portion of a coil wire is entwined around the terminal pin and is the coil wire wound around the bobbin, wherein a concave portion which concaves to a radial direction of the bobbin and penetrates to an axial direction of the bobbin is formed between the terminal pin embedding portions, the coil wire exists from a base portion of the terminal pin, passes through the concave portion, was started to be wound around the bobbin, and has a slack portion which exists in the concave portion.

The coil assembly having the abovementioned structure is produced as follows. First, a slack forming pin is inserted into the concave portion between the terminal pin embedding portions from an axial direction of the bobbin, and while maintaining this condition, the end portion of the coil wire is entwined around the terminal pin, and the coil wire is hung on the slack forming pin and is wound around the bobbin. After the coil wire is wound around the bobbin a predetermined number of times, the other end portion of the coil wire is entwined around another terminal pin. By pulling out the slack forming pin from the concave portion, the portion of the coil wire which hung on the slack forming pin is a slack portion. In this way, in the coil assembly of the present invention, the slack portion can be formed in the coil wire by the facilitated operation in which the slack forming pin is inserted into the concave portion and is then pulled out. In addition, since the slack portion exists in the concave portion, during winding of the coil wire by attaching the bobbin to a spindle of a winding apparatus, a problem in that the slack portion gyrates to a large extent due to a centrifugal force, and winding of the coil wire being blocked can be prevented. In addition, during winding of the coil wire around the bobbin, since the slack portion exists in the concave portion and does not protrude inside the bobbin, the slack portion can be prevented from being involved with the coil wire.

In the coil assembly produced as mentioned above, the slack portion has a shape conforming to a shape of an outer circumference of a slack forming pin which is inserted so as to be capable of moving back and forth in the concave portion. In a case in which a cross section of the slack forming pin is circular, the slack portion has a curved shape, and it is difficult to break even in a case in which tensile force is generated in the coil wire.

It is desirable that the coil wire be entwined around all along from an intermediate portion along a longitudinal direction of the terminal pin to the terminal pin embedded portion. Since an insulation coating is formed on the coil wire, the portion entwined around is soldered so as to be conductive with the terminal pin. When the portion of the terminal pin entwined around by the coil wire is soldered by a dip method or a jet method, there is a risk that solder will adhere to the slack portion if the slack portion protrudes more than a surface of the terminal pin embedding portion; however, since the slack portion exists in the concave portion and does not protrude more than the surface of the terminal pin embedding portion, solder can be prevented from adhering to the slack portion.

The present invention also relates to a stepping motor including the abovementioned coil assembly. That is, the present invention is a stepping motor including a stator, and a rotor supported rotatably at an inner circumferential side of the stator, in which the stator includes an outer yoke and an inner yoke, which are attached sandwiching the coil assembly.

According to the present invention, a coil assembly in which a slack portion can be formed in a coil wire, without increasing assembling cost, by facilitating operation, and a stepping motor using the same, can be provided.

BEST MODE FOR CARRYING OUT THE INVENTION

1. Structure of Stepping Motor
(Overall Structure)

Figures 1, 2:
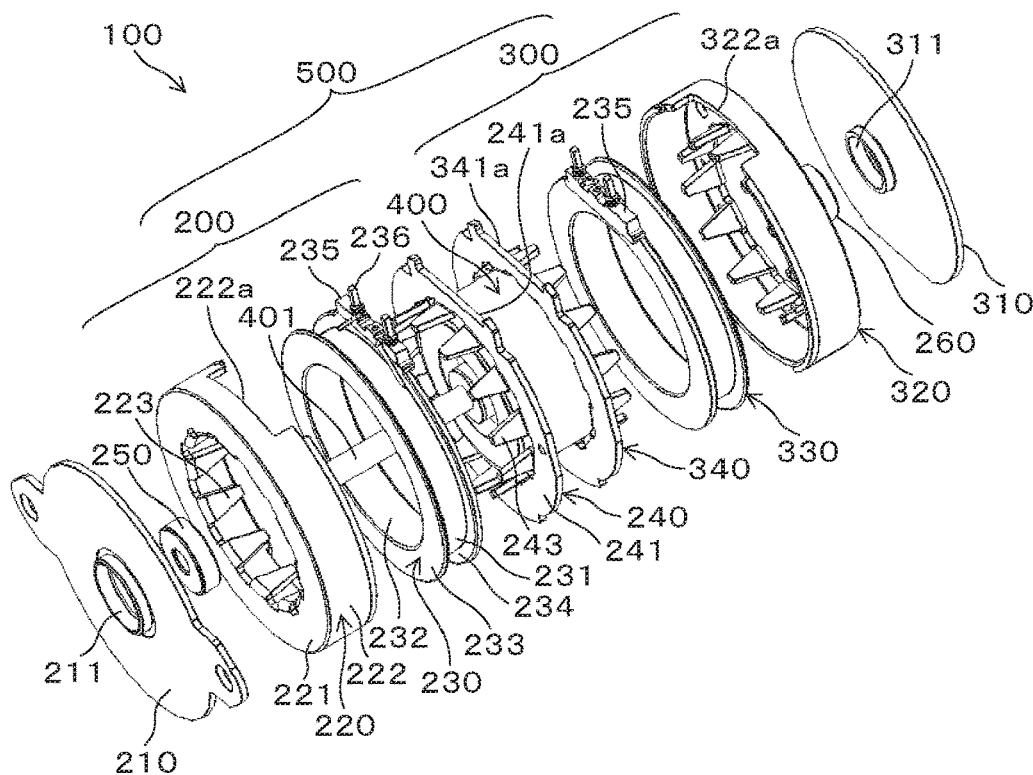
FIG. 1 is an exploded perspective view of the stepping motor of the embodiment of the present invention.
FIG. 2 is an exploded perspective view of the A phase stator unit of the embodiment of the present invention.

FIG. 1 shows a stepping motor 100 of the embodiment. The stepping motor 100 is a claw-pole-type two-phase PM-type (Permanent Magnet-type) stepping motor. The stepping motor 100 includes a stator 500. The stator 500 has a structure in which an A phase stator unit 200 and a B phase stator unit 300 are combined in an axial direction. Here, the A phase stator unit 200 and the B phase stator unit 300 have the same structure, and one is opposite to the other in an axial direction, back surfaces thereof are in contact and are combined, thereby constructing the stator 500.

A front plate 210 is fixed to the A phase stator unit 200, and an end plate 310 is fixed to the B phase stator unit 300. The stator 500 has a substantially cylindrical shape, and a rotor 400 is housed therein in a rotatable condition.
(Structure of the A Phase Stator Unit 200)

FIG. 2 is an exploded perspective view of the A phase stator unit 200. As shown in FIG. 2, the A phase stator unit 200 has a structure in which an outer yoke 220, a coil assembly 230, and an inner yoke 240 are combined in an axial direction. The outer yoke 220 is a portion which functions as a yoke at which a magnetic path is formed, and it is made of a magnetic material such as electromagnetic soft iron or rolled steel plate. The outer yoke 220 has a tabular circular ring portion 221, an outer cylindrical portion 222 which has a circular cylindrical shape and extends from an outer end portion of the circular ring portion 221 in an axial direction, and substantially triangular pole teeth 223 which extend from an end portion of an inner circumferential side of the circular ring portion 221 in an axial direction and which are multiply arranged along a circumferential direction with a certain gap therebetween. In the outer cylindrical portion 222, a cut portion 222a into which a terminal block 235, explained below, engages, is formed. The coil assembly 230 around which a coil (stator coil) 231 is wound is arranged in a circular cylindrical space between the outer cylindrical portion 222 and the multiple pole teeth 223 in the outer yoke 220. It should be noted that the structure of the coil assembly 230 is explained below in detail.

The inner yoke 240 is a portion which functions as a yoke at which a magnetic path is formed, and is made of a magnetic material such as electromagnetic soft iron or rolled steel plate. The inner yoke 240 has a tabular circular ring portion 241 and substantially triangular pole teeth 243 which extend from an end portion of an inner circumferential side of the circular ring portion 241 to an axial direction and which are multiply arranged along a circumferential direction with a certain gap therebetween. A cut portion 241a into which the terminal block 235 engages is formed in the circular ring portion 241. The pole teeth 243 of the inner yoke 240 and pole teeth 223 of the outer yoke 220 are intermeshed with each other in a circumferential direction.

An inner yoke 340 of the B phase stator unit 300 is one which is reversing a member similar to the inner yoke 240 of the A phase stator unit 200 along an axial direction. By facing and contacting the same surfaces of the inner yoke 240 and the inner yoke 340, the A phase stator unit 200 and the B phase stator unit 300 are combined.

The front plate 210 is fixed with a surface of the circular ring portion 221 of the outer yoke 220 opposite to the surface facing the coil assembly 230. The front plate 210 has a circular opening portion 211 at the center thereof, and a bearing 250 is attached to the opening portion 211.
(Structure of the B Phase Stator Unit)

The B phase stator unit 300 has the same structure as that of the A phase stator unit 200, and one having the same structure as the A phase stator unit 200 is used in a reverse condition along an axial direction as the B phase stator unit 300. The B phase stator unit 300 has a structure in which an outer yoke 320, a coil assembly 330, and the inner yoke 340 are combined in an axial direction. Here, the outer yoke 320 is a part having the same structure as the outer yoke 220, and the coil assembly 330 is a part having the same structure as the coil assembly 230. The end plate 310 is fixed with the outer yoke 320. The end plate 310 has a circular opening portion 311 at the center thereof, and a bearing 260 is attached to the opening portion 311.
(Structure of the Rotor)

The rotor 400 has a substantially cylindrical structure and has a permanent magnet such as a ferrite magnet, a rare earth magnet, or the like at an outer circumference thereof. This permanent magnet has a magnetic pole structure which is magnetized in a condition in which the magnetic pole alternates as NSNS along the circumferential direction of the outer circumferential surface thereof. A shaft 401 is fixed to the axial center of the rotor 400 in a condition penetrating in an axial direction, one end portion of the shaft 401 protruding from the rotor 400 to the left side in FIG. 1 is rotatably supported by the front plate 210 via the bearing 250, and the other end portion of the shaft 401 protruding from the rotor 400 to the right side is rotatably supported by the end plate 310 via the bearing 260.

2. Structure of Coil Assembly

Figure 3:
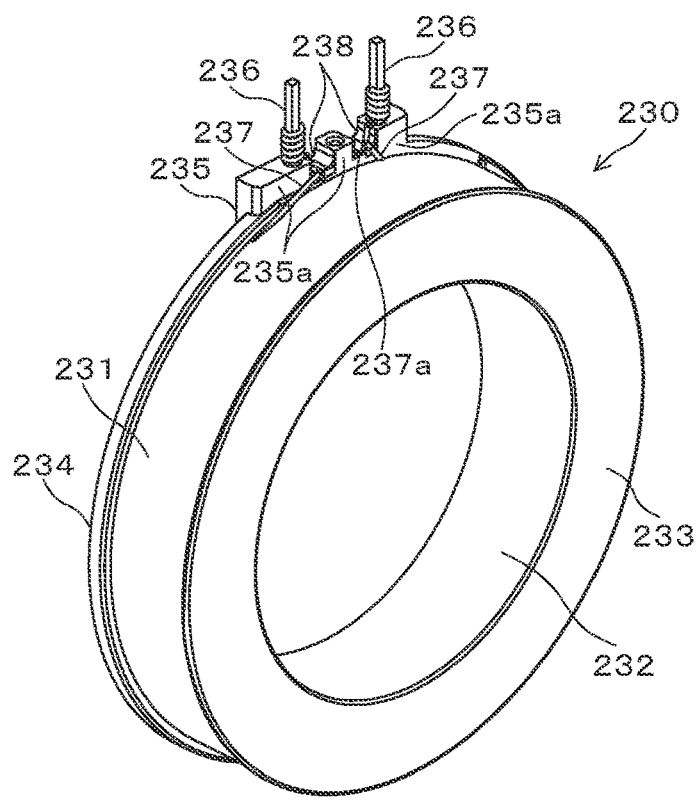
FIG. 3 is a perspective view showing the coil assembly of the embodiment of the present invention.
Figure 4:
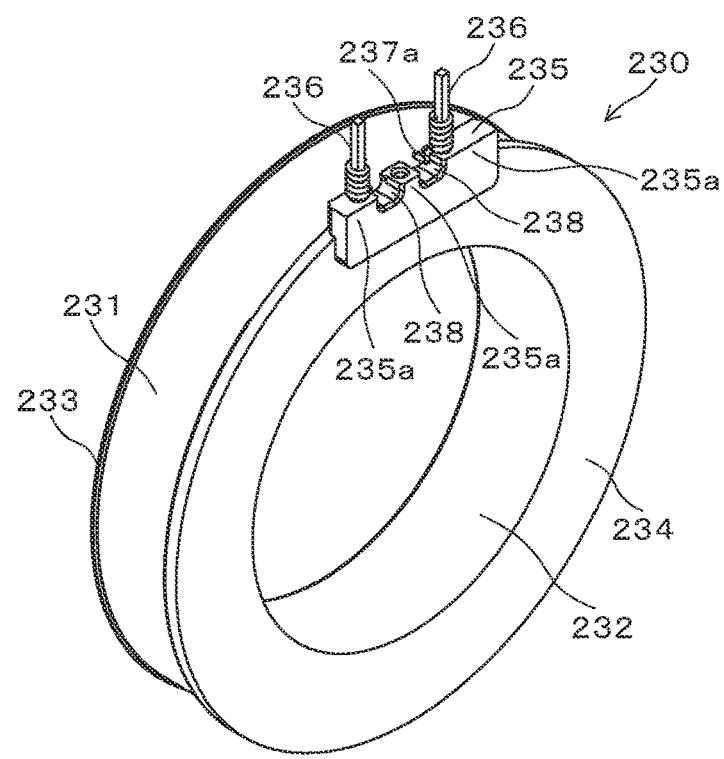
FIG. 4 is a perspective view in which the coil assembly of FIG. 3 is seen from the opposite direction.

As shown in FIGS. 3 and 4, the coil assembly 230 has a bobbin 232 around which a coil wire 237 is wound constructing the coil 231 having a coaxial structure with an axial center. The bobbin 232 is made of resin and is formed by an injection molding method. Flange portions 233 and 234 are formed at both ends along an axial direction of the bobbin 232 in order to prevent release of the winding of the coil 231. At one flange portion 234, the terminal block 235 is formed. The terminal block 235 is a rectangular block which protrudes from the flange portion 234 in an axial direction and is integrally formed with the flange portion 234. Multiple (in this embodiment, three) terminal pin embedding portions 235a are formed in the terminal block 235, and concave portions 238 are formed among the terminal pin embedding portions 235a.

Multiple (in this embodiment, two) metallic terminal pins 236 are embedded in the terminal pin embedding portions 235a by a method such as press fitting or insert molding. The end portion of the coil wire 237 of the coil 231 is entwined around the terminal pin 236. The concave portion 238, which concaves downwardly in the figure and penetrates in an axial direction, is formed between the terminal pin embedding portions 235a. In the concave portion 238 of right side in FIG. 3, a slack portion 237a of the coil wire 237 is formed. This slack portion 237a is a portion of a beginning of winding of the coil wire 237.

As shown in FIG. 2, the coil assembly 230 having the abovementioned structure is joined sandwiched by the outer yoke 220 and the inner yoke 240, and the terminal block 235 is engaged in the cut portion 222a of the outer yoke 220 and in the cut portion 241a of the inner yoke 240, thereby constructing the A phase stator unit 200. Furthermore, as shown in FIG. 1, the coil assembly 330 is also similarly joined sandwiched by the outer yoke 320 and the inner yoke 340, and the terminal block 235 is engaged in a cut portion 322a of the outer yoke 320 and in a cut portion 341a of the inner yoke 340, thereby constructing the B phase stator unit 300.

3. Step for Forming Coil Assembly

Figure 5:
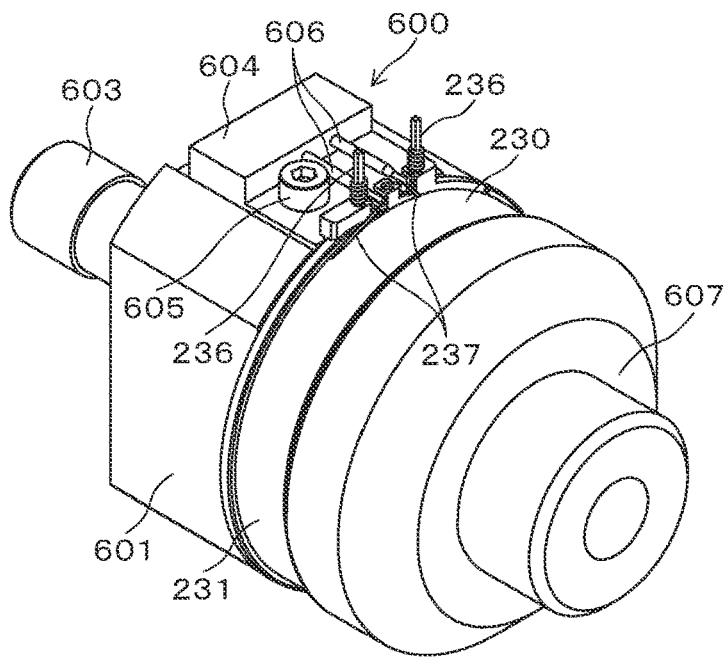
FIG. 5 is a perspective view showing a condition in which the bobbin is attached to the spindle of the winding apparatus and the coil wire is wound therearound.
Figure 6:
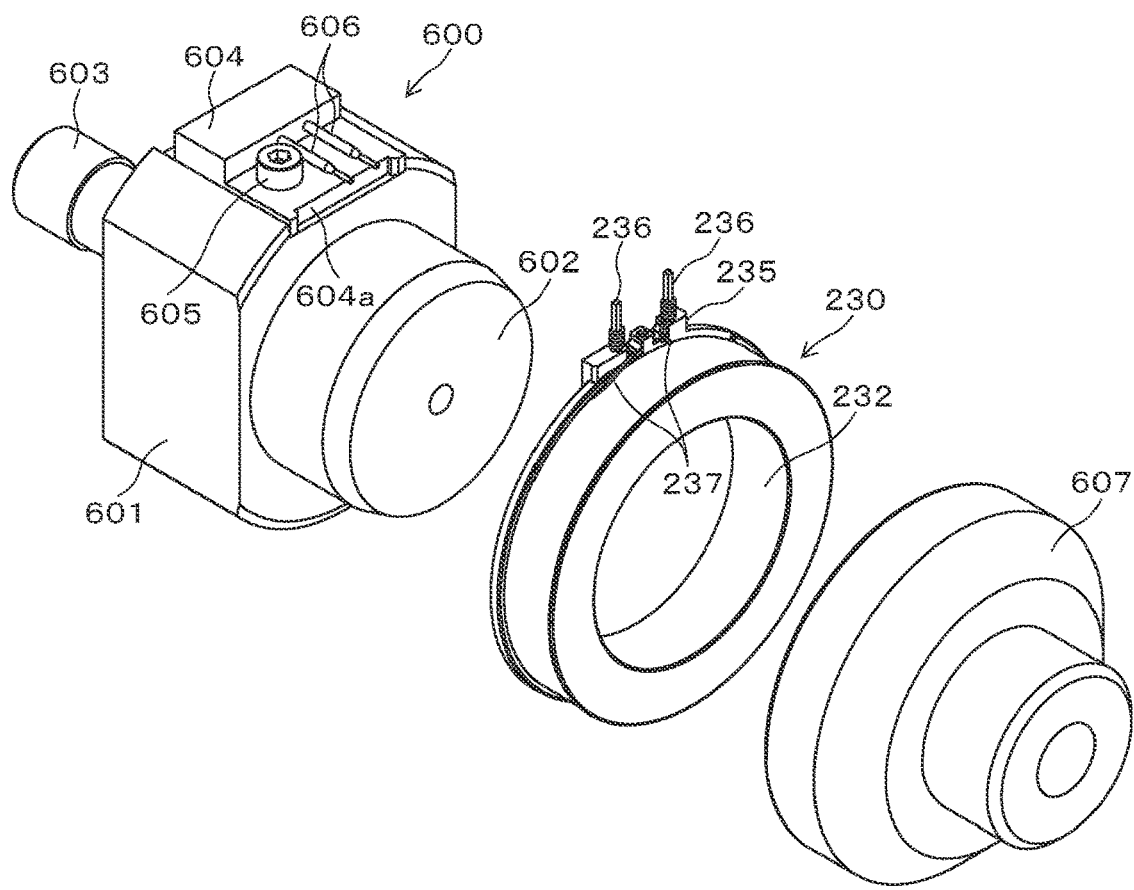
FIG. 6 is an exploded perspective view of FIG. 5.
Figure 7:
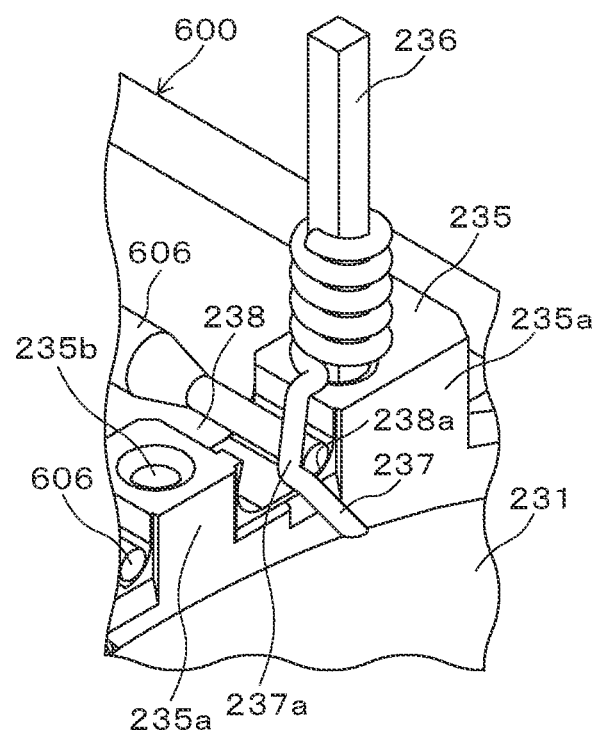
FIG. 7 is an enlarged perspective view showing a main part of FIG. 5.

A step for forming the coil assembly 230 is explained with reference to FIGS. 5 to 7. In FIG. 5, reference numeral 600 is a spindle of an automatic winding apparatus, and it is attached to a main unit of the automatic winding apparatus and rotates. As shown in FIG. 6, the spindle 600 includes a main body 601 formed by a substantially rectangular block, a bobbin receiving portion 602 having a circular plate shape, and a shank portion 603 which is held by the main unit of the automatic winding apparatus.

On an upper surface of the main body 601, a base 604 is attached by a screw 605. A slack forming pin 606 is attached to the base 604. A base portion of the slack forming pin 606 is formed to be thick so as to maintain stiffness. A concave portion 604a is formed on one side of the base 604 which faces an axial direction, and the terminal block 235 engages in this concave portion 604a so as to perform alignment. It should be noted that reference numeral 607 in the figure is a pressing member which affixes the bobbin 232 attached to the bobbin receiving portion 602. The pressing member 607 is moved to the main body 601 side by a driving mechanism (not shown), sandwiches the coil assembly 230 by cooperating with the main body 601, and rotates with the spindle 600 in that condition.

Next, a step is explained in which the coil wire 237 is wound around the bobbin 232 so as to form the coil assembly 230. First, by means of working by hand, by manipulator, or the like, the bobbin 232 is attached to the bobbin receiving portion 602, and the pressing member 607 is attached to the bobbin receiving portion 602 so as to sandwich the bobbin 232 by the main body 601 and the pressing member 607. At this time, a top portion of the slack forming pin 606 having a small diameter is inserted in the concave portion 238 formed between the terminal pin embedding portions 235a. As shown in FIG. 7, a circular cylindrical curve surface 238a is formed at a corner portion of the concave portion 238, and an outer circumferential surface of the slack forming pin 606 contacts, or is arranged very close to, the circular cylindrical curve surface 238a.

The automatic winding apparatus has a nozzle which feeds the coil wire 237 and is movable in three dimensions. First, the coil wire 237 fed from the nozzle is entwined around the terminal pin 236. After the coil wire 237 is entwined to a surface of the terminal pin embedding portion 235a, the nozzle hangs the coil wire 237 on the slack forming pin 606 and introduces it to a body portion of the bobbin 232. In this condition, the spindle 600 rotates counterclockwise seen from a right side of FIG. 5, and the coil wire 237 is wound around the bobbin 232. At this time, although tensile force acts on the coil wire 237 and bend stress is imparted to the slack forming portion 606, the slack forming portion 606 is supported by the circular cylindrical curve surface 238a of the concave portion 238, and thereby restrains or blocks the deformation. During winding of the coil wire 237, the nozzle moves in an axial direction so that the coil wire 237 is maintained even. After winding of the coil wire 237 is completed, the spindle 600 stops, and the nozzle feeds a portion of the coil wire 237 of an ending of the winding, and at the same time entwined it around the other terminal pin 236.

After finishing the entwining around of the coil wire 237, the nozzle cuts the coil wire 237. The pressing member 607 is detached from the bobbin receiving portion 602 by moving back, and the coil assembly 230 around which the coil wire 237 is wound is detached from the spindle 600 by means of operation by hand, by manipulator, or the like. In this way, as a result, the slack forming pins 606 are pulled out of the concave portions 238, tensile force imparted at the beginning portion of the coil wire 237 is released, and the slack portions 237a remains in the concave portion 238.

In the coil assembly 230 having the abovementioned structure, the slack portion 237a can be formed in the coil wire 237 by a simple operation in which the slack forming pins 606 are inserted into the concave portions 238 of the terminal block 235, the coil wire 237 is wound around the bobbin 232, and the slack forming pins 606 are pulled out after winding. In addition, since the slack portion 237a exists in the concave portion 238, during attaching the bobbin 232 to the spindle 600 of the automatic winding apparatus and winding the coil wire 237, a problem in which the slack portion 237a gyrates to a large degree due to centrifugal force that can block winding can be restrained. In addition, during winding of the coil wire 237 around the bobbin 232, since the slack portion 237a exists in the concave portion 238 and does not protrude from an inner-side surface of the flange portion 234, the slack portion 237a can be prevented from involvement.

In particular, in the above embodiment, the slack portion 237a has a shape which follows along an outer circumference of the slack forming pin 606 which is inserted in the concave portion 238. Since a cross section of the slack forming pin 606 is a circle, the slack portion 237a has a curved shape, and it is difficult for it to break even in a case in which tensile force is imparted to the coil wire 237.

In the above embodiment, the coil wire 237 is entwined around from an intermediate portion in a longitudinal direction of the terminal pin 236 to the terminal pin embedding portion 235a. Since an insulation coating is formed on the coil wire 237, the portion entwined around is treated by soldering so as to be conductive with the terminal pin 236.

When the portion of the terminal pin entwined around is soldered by a dip method or a jet method, there is a risk that solder will adhere on the slack portion 237a if the slack portion 237a protrudes more than a surface of the terminal pin embedding portion 235a; however, since the slack portion 237a exists in the concave portion 238 and does not protrude more than the surface of the terminal pin embedding portion 235a, adhering of solder to the slack portion 237a can be prevented.

4. Modifications

In the above embodiment, the present invention is applied to a unifilar winding (bipolar driving) in which the number of the terminal pins 236 is two and the number of the coil wire 237 is one. The present invention can also be applied to a bifilar winding (unipolar driving) in which the number of the terminal pins 236 is three and the number of the coil wires 237 is two. In this case, the terminal pin 236 is press-fitted in a terminal pin press-fitting hole 235b formed in the central terminal pin embedding portion 235a shown in FIG. 7, and the coil wire 237 is started to wind also from this terminal pin 236. Therefore, also in this case, the coil wire 237 is fed from each of two nozzles arranged in an automatic winding apparatus (not shown) after a portion the coil wire for beginning of winding is entwined around each of the terminal pin 236 of one end side and the terminal pin 236 embedded in the central terminal pin embedding portion 235a, and each of the coil wires 237 is hung on each of the slack forming pins 606 inserted in each of the concave portions 238, and is wound around the bobbin 232 a predetermined number of times. After winding the coil wire 237, each nozzle entwines a portion of the coil wire 237 of an end of winding around the central terminal pin 236 and the terminal pin 236 of the other end. In this way, each of the slack portions 237a formed in each portion of the beginning of a winding exists in each of the concave portions 238.

In the above embodiment, two slack forming pins 606 are attached to the base 604. This is because the slack forming pins 606 are installed in order to form the slack portion 237a in the coil wire 237 of a portion of the beginning of a winding, for applying both the unifilar winding and the bifilar winding. It should be noted that it is sufficient for the base 604 to at least include the slack forming pin 606 for forming the slack portion 237a in the portion of the coil wire 237 at the beginning of the winding, and it can be one which is specially designed for each of the unifilar winding or the bifilar winding.

In the above embodiment, although the multiple terminal pin embedding portions 235a are formed in the terminal block 235, another embodiment is possible in which multiple terminal blocks (terminal pin embedding portions) are formed apart from each other in the flange portion 234, and a gap between the terminal blocks is used as a concave portion. Also in this case, similar to the above embodiment, the slack forming pin 606 is inserted in the concave portion, thereby enabling formation of the slack portion 237a in the coil wire 237.

In the above embodiment, although the slack portion 237a is formed during the beginning of a winding of the coil wire 237 around the bobbin 232, if necessary, the slack portion 237a can be formed at the end of the winding. In this case, the slack forming pin 606 is arranged at a left corner facing the spindle 600 side of the concave portion 238.

The present invention is not limited to only a claw-pole-type two-phase stepping motor as mentioned above in the embodiments, and it can be applied to any other type of stepping motor, such as a hybrid-type stepping motor.

The present invention is applicable to the technical field of stepping motors.

EXPLANATION OF REFERENCE NUMERALS

100: Stepping motor, 200: A phase stator unit, 210: front plate, 211: opening portion, 220: outer yoke, 221: circular ring portion, 222: outer cylindrical portion, 222a: cut portion, 223: pole tooth, 230: coil assembly, 231: coil, 232: bobbin, 233: flange portion, 234: flange portion, 235: terminal block, 235a: terminal pin embedding portion, 235b: terminal pin press-fitting hole, 236: terminal pin, 237: coil wire, 237a: slack portion, 238: concave portion, 240: inner yoke, 241: circular ring portion, 241a: cut portion, 243: pole tooth, 250: bearing, 260: bearing, 300: B phase stator unit, 310: end plate, 311: opening portion, 320: outer yoke, 322a: cut portion, 330: coil assembly, 340: inner yoke, 341a: cut portion, 400: rotor, 401: shaft, 500: stator, 600: spindle, 601: main body, 602: bobbin receiving portion, 603: shank portion, 604: base, 604a: concave portion, 605: screw, 606 slack forming pin, 607: pressing member.

What is claimed is:

1. A coil assembly comprising:
a bobbin having flange portions at both ends thereof;
a terminal block integrally formed at one flange portion;
multiple terminal pin embedding portions arranged at the terminal block;
a terminal pin embedded in the terminal pin embedding portion; and
a coil of which an end portion of a coil wire is entwined around the terminal pin, the coil wire wound around the bobbin,
wherein a concave portion which concaves to a radial direction of the bobbin and penetrates to an axial direction of the bobbin is formed between the terminal pin embedding portions,
the coil wire exists from a base portion of the terminal pin, passes through the concave portion, starts to be wound around the bobbin, and has a slack portion which exists between terminal pins and in the concave portion.

2. The coil assembly according to claim 1, wherein the slack portion has a shape conforming to a shape of an outer circumference of a slack forming pin which is inserted so as to be capable of moving back and forth in the concave portion in the axial direction.

3. The coil assembly according to claim 1, wherein the coil wire is entwined around all along from the terminal pin to the terminal block.

4. The coil assembly according to claim 2, wherein the coil wire is entwined around all along from the terminal pin to the terminal block.

5. A stepping motor comprising:
a stator; and
a rotor supported rotatably at an inner circumferential side of the stator,
wherein the stator includes an outer yoke and an inner yoke which are attached sandwiching the coil assembly according to claim 1.

6. A stepping motor comprising:
a stator; and
a rotor supported rotatably at an inner circumferential side of the stator,
wherein the stator includes an outer yoke and an inner yoke which are attached sandwiching the coil assembly according to claim 2.

7. A stepping motor comprising:
a stator; and a rotor supported rotatably at an inner circumferential side of the stator, wherein the stator includes an outer yoke and an inner yoke which are attached sandwiching the coil assembly according to claim 3.

8. A stepping motor comprising:

a stator; and a rotor supported rotatably at an inner circumferential side of the stator, wherein the stator includes an outer yoke and an inner yoke which are attached sandwiching the coil assembly according to claim 4.

9. The coil assembly according to claim 1, wherein the slack portion is arranged close to a base portion of the terminal pin and in the concave portion.

10. The coil assembly according to claim 1, wherein the terminal pin embedding portions have radially outer surfaces from which the terminal pins project, the concave portion is located between the radially outer surfaces and concaves from the radially outer surfaces to the radial direction.

* * * * *